US006876613B2

(12) United States Patent
Byun et al.

(10) Patent No.: US 6,876,613 B2
(45) Date of Patent: Apr. 5, 2005

(54) DISC CRACK DETECTION METHOD AND METHOD OF CONTROLLING SPEED OF DISC DRIVE USING THE SAME

(75) Inventors: Sung-jin Byun, Seoul (KR); Kyoung-seo Min, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 09/983,219

(22) Filed: Oct. 23, 2001

(65) Prior Publication Data

US 2002/0105876 A1 Aug. 8, 2002

(30) Foreign Application Priority Data

Feb. 5, 2001 (KR) .......................................... 2001-5373

(51) Int. Cl.[7] ................................................ G11B 7/00
(52) U.S. Cl. ............................... 369/53.15; 369/53.13; 369/44.32
(58) Field of Search ......................... 369/44.27, 44.28, 369/44.32, 44.33, 44.34, 44.41, 47.1, 53.1, 53.12, 53.13, 53.15, 53.17, 59.1

(56) References Cited

U.S. PATENT DOCUMENTS 4,764,860 A    8/1988   Takao 5,867,461 A  *  2/1999   Baas ........................ 369/44.32

FOREIGN PATENT DOCUMENTS

| EP | 0 284 443 | 9/1988 |
|----|-----------|--------|
| EP | 1 049 086 | 11/2000 |
| JP | 10-92090 | 4/1998 |
| JP | 10-149614 | 6/1998 |
| JP | 10-188464 | 7/1998 |
| JP | 10-199131 | 7/1998 |
| JP | 11232663 | 8/1999 |
| JP | 11273266 | 10/1999 |
| JP | 2000-207824 | 7/2000 |

OTHER PUBLICATIONS

Japanese Office Action, dated Mar. 23, 2004.

* cited by examiner

*Primary Examiner*—Muhammad Edun
(74) *Attorney, Agent, or Firm*—Staas & Halsey LLP (57) ABSTRACT

A method of detecting a crack in a disc loaded on a disc drive and a method of automatically lowering a target speed in response to the detection of a crack in order to stabilize the disc drive. According to the methods, it is automatically determined whether a disc loaded on a disc drive has a crack in a specific mode, and a target speed is automatically changed into a low speed when it is determined that the disc has a crack. Therefore, the crack state of the disc is exactly checked during action of the disc drive, the percentage of error occurrence is decreased, and the probability of damage to the disc is reduced.

31 Claims, 7 Drawing Sheets

FIG. 8B

DISC CRACK DETECTION METHOD AND METHOD OF CONTROLLING SPEED OF DISC DRIVE USING THE SAME

CROSS-REFERENCE TO RELATED APPLICATIONS

This application claims the benefit of Korean Patent Application No. 2001-5373 filed on Feb. 5, 2001, in the Korean Industrial Property Office, the disclosure of which is incorporated herein by reference.

BACKGROUND OF THE INVENTION

1. Field of the Invention

The present invention relates to a method of controlling a disc drive, and more particularly, to a method of detecting a crack on a disc loaded on a disc drive and a method of automatically lowering a target speed in response to the detection of a crack in order to stabilize the disc drive.

2. Description of the Related Art

Optical disc recording media include compact discs such as CD-ROMs and digital versatile discs or DVDs suitable for multimedia. Disc drives corresponding to these optical disc recording media read data by radiating a laser beam at a track on a turning disc using an optical pickup and detecting light reflected from the track, or record data by radiating a laser beam which is recording data after having been modulated.

To increase the data processing speed of such a disc drive, the system has been improved to increase the speed of rotation of a disc. The speed factor of present disc drives has rapidly increased to forty-eight times a single speed disc drive (48×) or more. As the speed of a disc drive is increased, a probability that an error occurs during data recording or reproduction increases when a disc has a defect. In particular, when a disc having a crack is rotated at a high speed, the disc can be eventually broken. This may fatally damage the disc drive and, moreover, threatens the safety of users.

A conventional disc drive cannot detect a crack on a disc and rotates a disc at a maximum speed set regardless of existence/nonexistence of a crack. Accordingly, the disc drive can be fatally damaged. Moreover, the safety of users may be threatened.

SUMMARY OF THE INVENTION

Accordingly, it is an object of the present invention to provide a disc crack detection method of detecting a crack in a disc with a minimum program load in a disc drive.

It is another object of the present invention to provide a method of controlling the speed of the disc drive using the disc crack detection method by automatically lowering the target speed of the disc drive when a crack is detected in the disc.

Additional objects and advantages of the invention will be set forth in part in the description which follows and, in part, will be obvious from the description, or may be learned by practice of the invention.

The foregoing and other objects of the present invention are achieved by providing a method of detecting a crack in a disc loaded on a disc drive, which includes the operations of (a) determining whether the disc drive satisfies an initially set condition for execution of a disc crack detection algorithm, (b) counting the number of tracking error signals whose levels exceed a predetermined threshold voltage, at predetermined measuring time periods, when it is determined that the disc drive satisfies the initially set condition in operation (a), and (c) generating a disc crack detection signal when the number of tracking error signals counted in operation (b) exceeds a predetermined number.

The above and other objects of the present invention may also be achieved by providing a method of detecting a crack in a disc loaded on a disc drive, which includes the operations of (a) determining whether the disc drive satisfies an initially set condition for execution of a disc crack detection algorithm, (b) counting the number of focus error signals whose levels exceed a predetermined threshold voltage, at predetermined measuring time periods, when it is determined that the disc drive satisfies the initially set condition in operation (a), and (c) generating a disc crack detection signal when the number of focus error signals counted in operation (b) exceeds a predetermined number.

The above and other objects of the present invention may also be achieved by providing a method of controlling the speed of a disc drive, which includes the operations of (a) determining whether a command instructing changing of the speed of the disc drive to a target speed is input, (b) controlling the speed of a spindle motor to be the target speed according to the command, (c) counting the number of tracking error signals whose levels exceed a predetermined threshold voltage, at predetermined measuring time periods until the current speed reaches the target speed, (d) generating a disc crack detection signal when the number of tracking error signals counted in operation (c) exceeds a predetermined number, and (e) changing the target speed into a predetermined low speed when the disc crack detection signal is generated.

The above and other objects of the present invention may also be achieved by providing a method of controlling the speed of a disc drive, comprising the operations of (a) determining whether a command instructing changing of the speed of the disc drive to a target speed is input, (b) controlling the speed of a spindle motor to be the target speed according to the command, (c) counting the number of focus error signals whose levels exceed a predetermined threshold voltage, at predetermined measuring time periods until the current speed reaches the target speed, (d) generating a disc crack detection signal when the number of focus error signals counted in operation (c) exceeds a predetermined number, and (e) changing the target speed into a predetermined low speed when the disc crack detection signal is generated.

The above and other objects of the present invention may also be achieved by providing a method of controlling the speed of a disc drive, which includes the operations of (a) determining whether a current play mode is changed into a pause mode, (b) counting the number of tracking error signals whose levels exceed a predetermined threshold voltage, at predetermined measuring time periods, when it is determined that the play mode is changed into the pause mode in operation (a), (c) generating a disc crack detection signal when the number of tracking error signals counted in operation (b) exceeds a predetermined number, and (d) changing a target speed into a predetermined low speed when the disc crack detection signal is generated.

BRIEF DESCRIPTION OF THE DRAWINGS

These and other objects and advantages of the present invention will become more apparent and more readily appreciated from the following description of the preferred embodiments, taken in conjunction with the accompany drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 1:
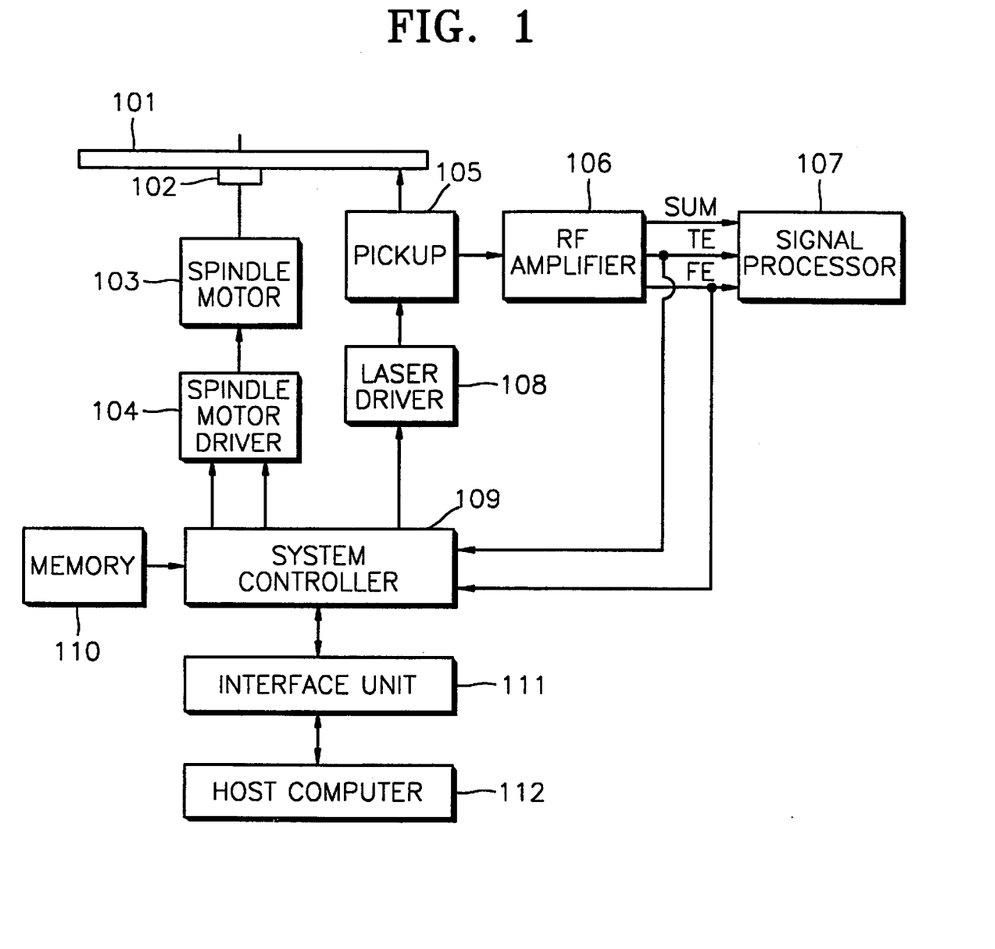
FIG. 1 is a diagram of the configuration of a disc drive to which the present invention is applied.

Referring to FIG. 1, a disc drive includes a disc 101, a turn table 102, a spindle motor 103, a spindle motor driver 104, a pickup 105, radio frequency (RF) amplifier 106, a signal processor 107, a laser driver 108, a system controller 109, a memory 110, an interface unit 111 and a host computer 112. The general operations of these members constructing a disc drive will be briefly described below.

The disc 101 is loaded on the turn table 102 and turned by the spindle motor 103 at a constant linear velocity during reproduction. The pickup 105 reads data which has been recorded to the disc 101 in the form of embossed pits or phase change pits.

A spindle frequency generator (FG) is installed at the spindle motor 103 to perform servo control on the spindle motor 103 so that an FG pulse is generated in synchronization with the rotation of the spindle motor 103. The system controller 109 detects information on the rotation of the spindle motor based on the spindle FG pulse and controls the spindle motor 103 to rotate at a target speed.

The pickup 105 includes a laser diode functioning as a laser light source, a photodetector detecting reflected light, and a variety of optical lenses. The pickup 105 emits optical signals output from the laser diode to the disc 101, detects light reflected from the disc 101 at the photodetector, converts the detected light into an electrical signal and outputs the electrical signal to the RF amplifier 106. The RF amplifier 106 includes a current-to-voltage converter circuit, a matrix operation/amplification circuit and so on in order to process currents output from a plurality of light receiving devices serving as the photodetector of the pickup 105. The RF amplifier 106 generates signals necessary to process a matrix operation. For example, an RF sum signal SUM which is reproduced data, a focus error signal FE and a tracking error signal TE are generated.

The signal processor 107 includes hardware and software that performs EFM demodulation, MPEG decoding and error correction.

The laser driver 108 generates a driving current so that the laser diode of the pickup 105 can generate recording and reproducing laser power.

The memory 110 stores a variety of execution programs and data to drive the disc drive and programs and data related to a disc crack detection method and to a method of controlling the speed of the disc drive using the disc crack detection method.

The interface unit 111 is connected to an external host computer 112 and communicates reproduced data and a variety of commands with the host computer 112.

Figure 7A:
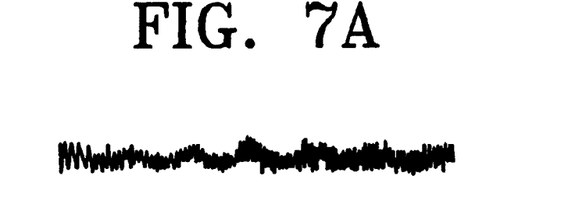
FIGS. 7A and 7B are waveform diagrams of a tracking error signal and a focus error signal, respectively, with respect to a normal disc in a pause mode.
Figure 7B:
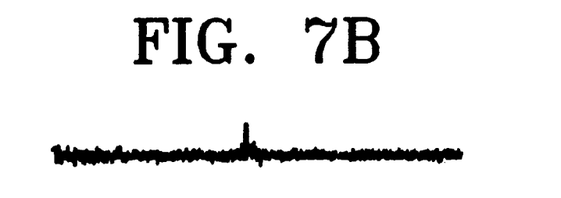
Figure 8A:
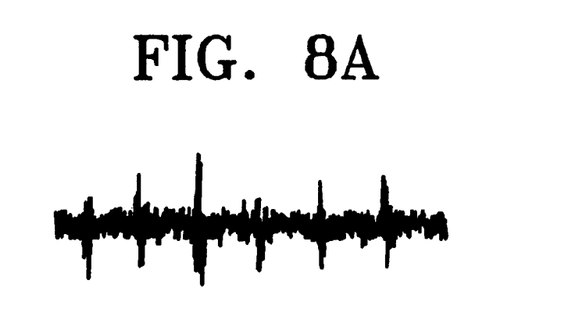
FIGS. 8A and 8B are waveform diagrams of a tracking error signal and a focus error signal, respectively, with respect to a disc with a crack in a pause mode.
Figure 8B:
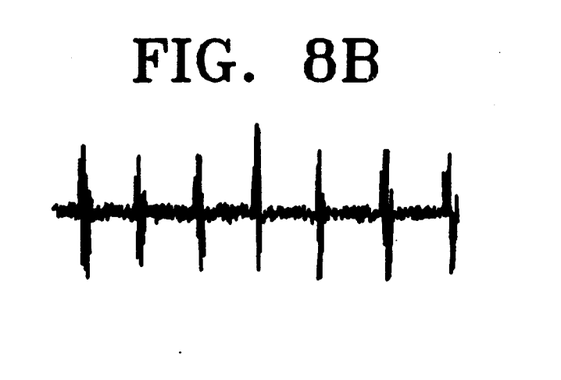

A disc crack detection method will be described in detail with reference to FIGS. 1 and 2. A crack detection algorithm according to the present invention is based on the fact that a tracking error signal and a focus error signal, which are different from those generated with respect to a normal disc, are generated with respect to a disc having a crack. In other words, as shown in FIGS. 7A and 7B, abnormal pulses rarely occur in a tracking error signal and a focus error signal when a disc is normal. On the contrary, as shown in FIGS. 8A and 8B, the tracking error signal and the focus error signal include abnormal pulses when a disc has a crack.

Accordingly, a crack detection algorithm according to the present invention counts the number of abnormal pulses contained in the tracking error signal or the focus error signal for a predetermined measuring time to determine whether a disc has a crack.

The following description concerns a crack detection algorithm according to the present invention. In operation 201, a measuring period To, a threshold voltage Vth and a maximum number Nmax, which are necessary for determining whether a disc has a crack, are set based on experimental statistics, and the set values are stored in the memory 110 as initial values. The number of abnormal pulses is counted for the measuring period To. The threshold voltage Vth is used to detect an abnormal pulse occurring in a tracking error signal TE or a focus error signal FE due to a crack on a disc. The maximum number Nmax indicates the number of abnormal pulses contained in the tracking error signal TE or the focusing error signal FE for the measuring period To, and is referred to in order to determine whether a disc has a crack.

In operation 202, the system controller 109 detects and monitors the level Vc of the tracking error signal TE or the focus error signal FE when a disc drive satisfies a condition for execution of the disc crack detection algorithm. That is, the disc crack detection algorithm may be executed when a play mode is changed into a pause mode, may be repeated at predetermined time intervals in the pause mode, or may be executed whenever a target speed is changed.

In operation 203, the level Vc of the tracking error signal TE or the focus error signal FE detected in operation 202 is compared with the threshold voltage Vth set and stored in the memory 110 in operation 201. In operation 204, counting is performed by increasing the number N of pulses by one when the detected level Vc of the tracking error signal TE or the focus error signal FE exceeds the threshold voltage Vth.

In operation 205, it is determined whether the counted number N exceeds the maximum number Nmax set and stored in the memory 110 in operation 201. In operation 207, a disc crack detection signal indicating that the disc has a crack is generated when the counted number N exceeds the maximum number Nmax.

However, when it is determined that the counted number N does not exceed the maximum number Nmax in operation 205, it is determined whether a measuring time T is no less than the measuring period To in operation 206. When it is determined that the measuring time T is no less than the measuring period To, it is concluded that a crack is not detected during the measuring period To so that the process ends. On the other hand, when it is determined that the measuring time T is less than the measuring period To in operation 206, the process goes back to operation 202, and the steps described above are repeated until the measuring period To elapses.

In the above disc crack detection algorithm, one of a tracking error signal and a focus error signal is selected, and the level of the selected signal is compared with a threshold voltage for a predetermined period of time to determine whether a disc has a crack. Alternatively, both the tracking error signal and the focus error signal can be used to determine whether a disc has a crack.

The following description concerns a method of controlling the speed of a disc drive using the disc crack detection algorithm described above. A method of controlling the speed of a disc drive according to an embodiment of the present invention will be described first with reference to FIGS. 1 and 3.

Figure 3:
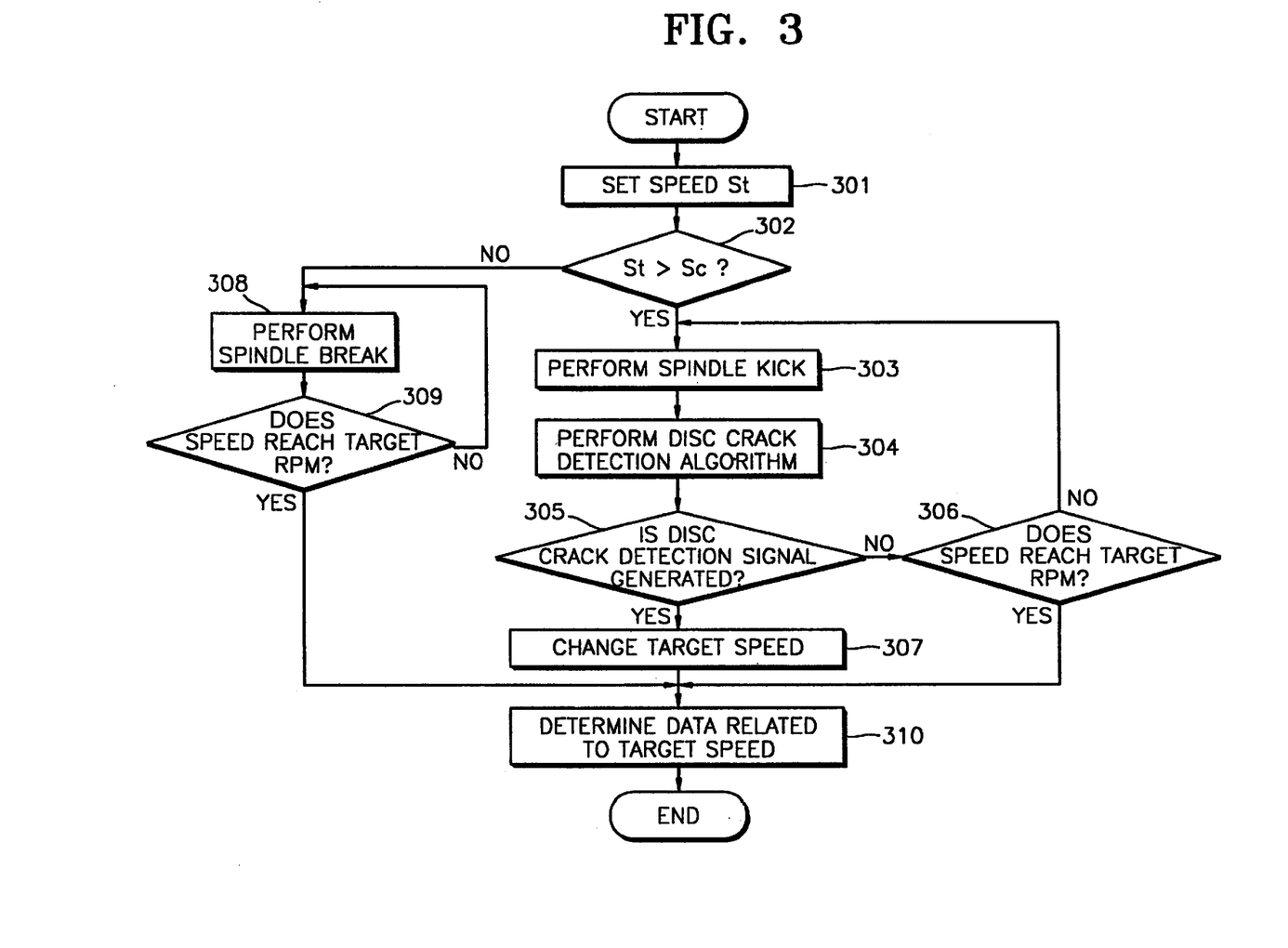
FIG. 3 is a flowchart of a method of controlling the speed of a disc drive according to an embodiment of the present invention.

Once a command to change the speed of a disc drive is transmitted from the host computer 112 to the system controller 109 through the interface unit 111, in operation 301 the system controller 109 analyzes the speed changing command and sets a target speed St and circuit control factors related to the target speed St. Next, a spindle motor is controlled as follows.

In operation 302 the target speed St set in operation 301 is compared with a current speed Sc. If the target speed St is lower than the current speed Sc, in operations 308 and 309 spindle break is performed until the speed of the disc drive becomes the target speed St to decrease the speed of the spindle motor 103. If the target speed St is higher than the current speed Sc, in operation 303 spindle kick is performed to increase the speed of the spindle motor 103.

Figure 2:
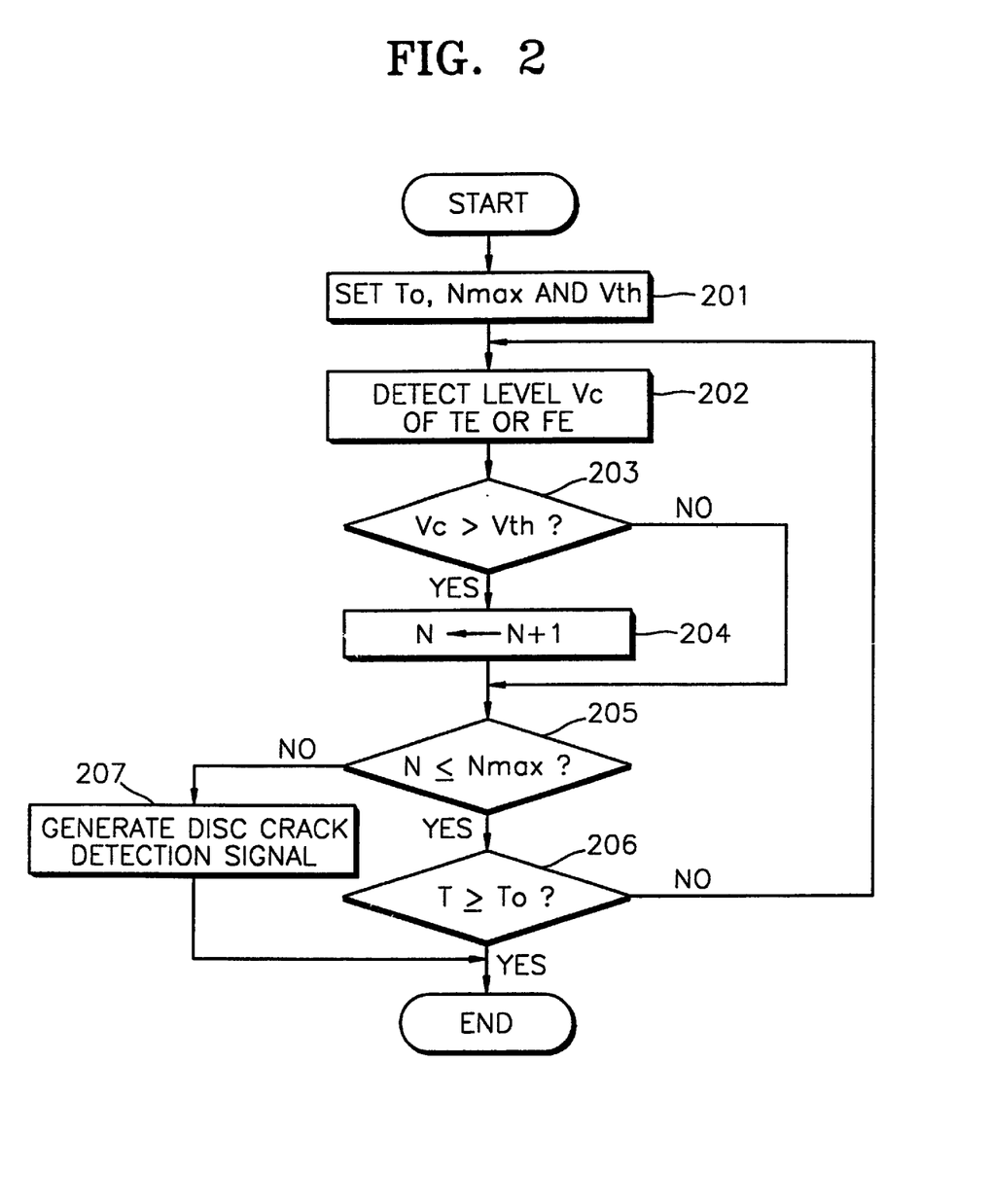
FIG. 2 is a flowchart of a disc crack detection method according to the present invention.

While increasing the speed of the spindle motor 103, in operation 304 the disc crack detection algorithm shown in FIG. 2 is performed. In other words, it is determined whether a disc has a crack while the speed of the disc drive is being increased.

In operation 305 it is determined whether a disc crack detection signal is generated as the result of the disc crack detection algorithm performed in operation 304. If the disc crack detection signal is not generated, in operation 306 it is determined whether the spindle motor 103 rotates at target revolutions per minute (rpm) corresponding to the target speed St. If the speed of the spindle motor 103 does not reach the target rpm, the process goes back to operation 303 and the operations described above are repeated.

If it is determined that the disc crack detection signal is generated in operation 305, the target speed is automatically changed to a low speed in operation 307. In operation 310, servo control factors and circuit factors are reset with respect to the changed speed. Here, the low speed may be the minimum speed of the disc drive, or the target speed can be sequentially lowered according to predetermined operations.

With such an arrangement, the disc crack detection algorithm is performed when the speed of a disc drive is increased, and the speed can be automatically lowered if it is determined that a disc has a crack. In the embodiment of FIG. 3, the disc crack detection algorithm is performed only when the speed of a disc drive is increased. However, the disc crack detection algorithm can be performed in the same manner as described above when the speed is decreased so that the speed can be controlled to be lower than a target speed when a crack is detected.

Figure 4:
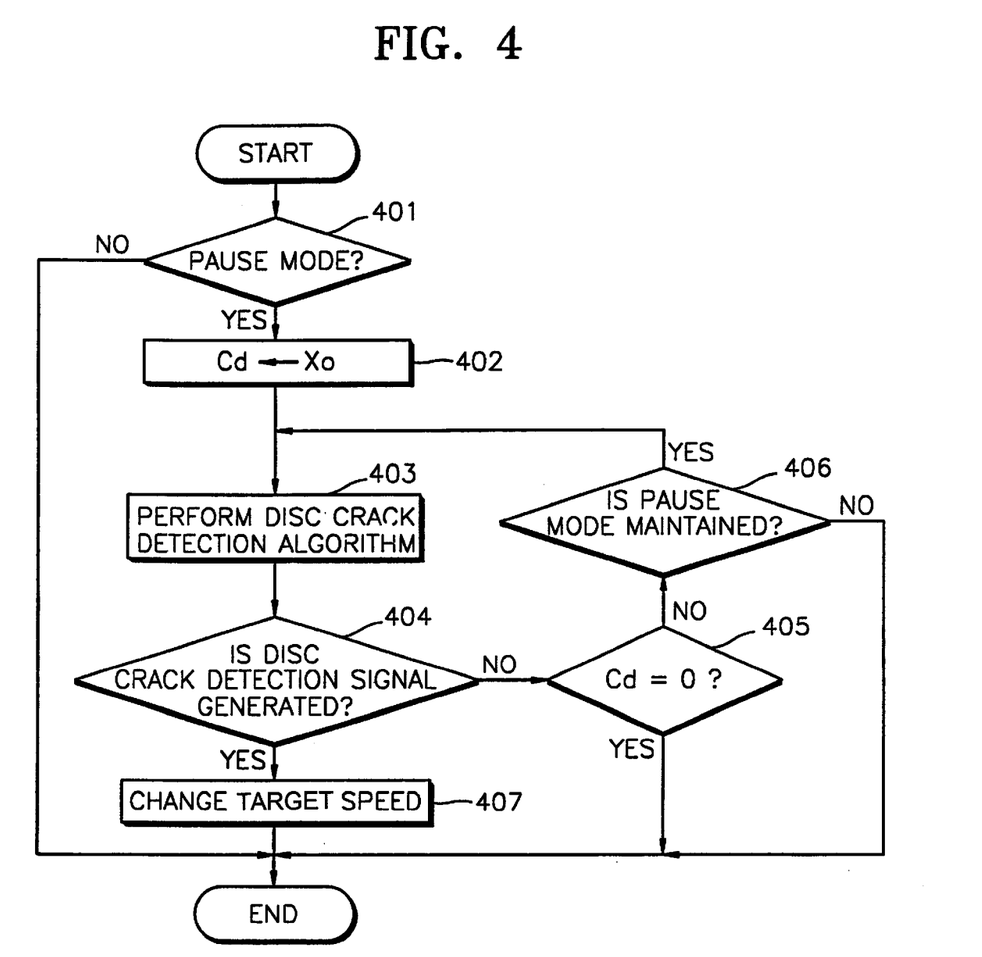
FIG. 4 is a flowchart of a method of controlling the speed of a disc drive according to another embodiment of the present invention.

A method of controlling the speed of a disc drive according to another embodiment of the present invention will now be described first with reference to FIGS. 1 and 4. In operation 401, the system controller 109 determines whether a current play mode is changed into a pause mode. If the play mode is changed into the pause mode, in operation 402 the value Cd of a down counter within the system controller 109 is initialized to Xo, and down counting is performed to repeatedly perform the disc crack detection algorithm for a predetermined period of time.

In operation 403 the disc crack detection algorithm shown in FIG. 2 is performed. In operation 404, it is determined whether a disc crack detection signal is generated as the result of the disc crack detection algorithm. If the disc crack detection signal is generated, in operation 407 a target speed is changed into a low speed. The speed is lowered to stabilize the disc drive when a disc has a crack.

If the disc crack detection signal is not generated, in operation 405 it is determined whether the value Cd of the down counter is zero. If the value Cd is zero, this disc drive speed control process ends without changing the target speed. Otherwise, since the period of time for which the disc crack detection algorithm is repeatedly performed has not elapsed, the pause mode is maintained in operation 406. If the pause mode is maintained, the process proceeds to operation 403 and is repeated.

With such an arrangement, the disc crack detection algorithm is repeated for a predetermined period of time starting from a point when the mode is changed into a pause mode, and a target speed is automatically changed into a low speed when a disc crack is detected.

A method of controlling the speed of a disc drive according to yet another embodiment of the present invention will now be described with reference to FIGS. 1 and 5. In the disc drive speed control method according to the embodiment shown in FIG. 4, the disc crack detection algorithm is performed only for a predetermined period of time in an initial stage when a play mode is converted into a pause mode, and the speed of a disc drive is automatically changed into a low speed when a disc crack is detected. But, in the disc drive speed control method according to the third embodiment shown in FIG. 5, the disc crack detection algorithm is performed periodically during a pause mode.

Figure 5:
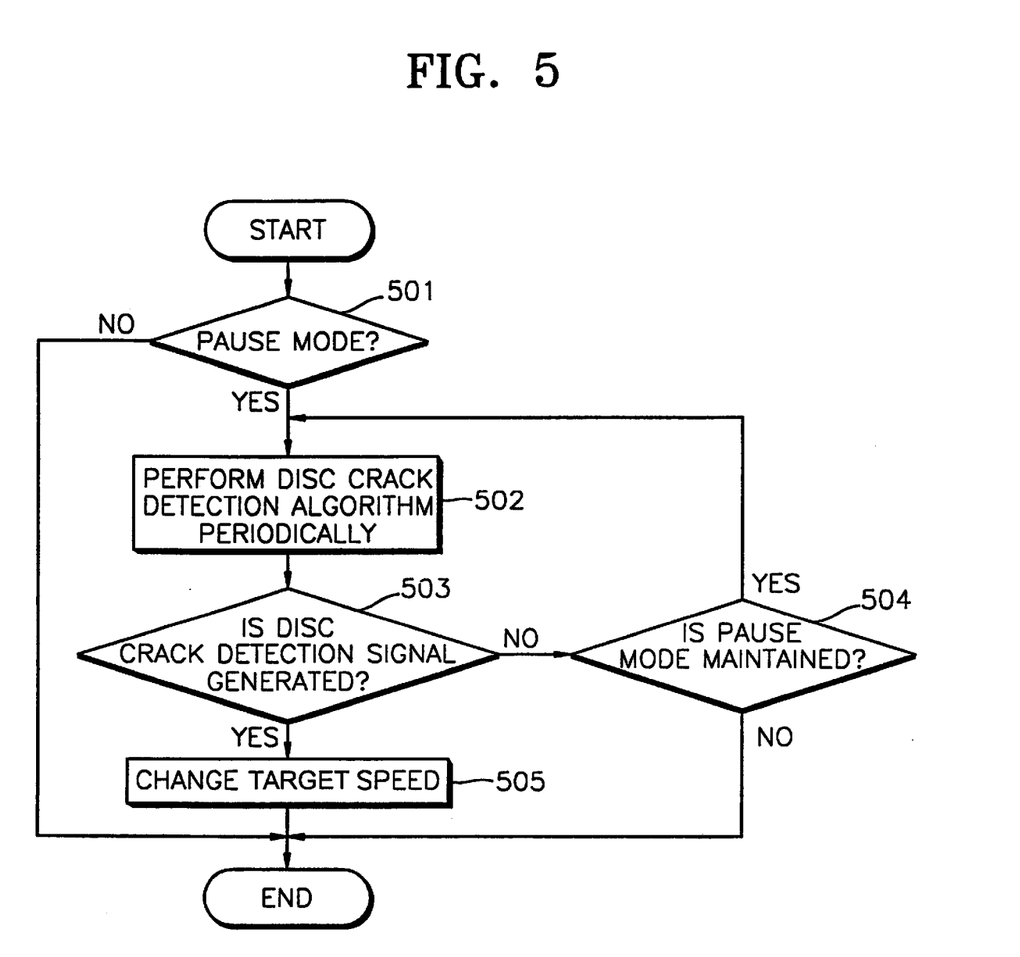
FIG. 5 is a flowchart of a method of controlling the speed of a disc drive according to yet another embodiment of the present invention.

Referring to FIG. 5, in step 501 the system controller 109 determines whether the play mode of a disc drive is changed into a pause mode. If the play mode is changed into the pause mode, in operation 502 the disc crack detection algorithm of FIG. 2 is performed periodically. In operation 503 it is determined whether a disc crack detection signal is generated as the result of the disc crack detection algorithm performed in operation 502. If the disc crack detection signal is generated, in operation 505 a target speed is changed to a low speed. If the disc crack detection signal is not generated as the result of operation 503, it is determined whether the pause mode is maintained in operation 504. If the pause mode is maintained, the process proceeds to operation 502.

Figure 6:
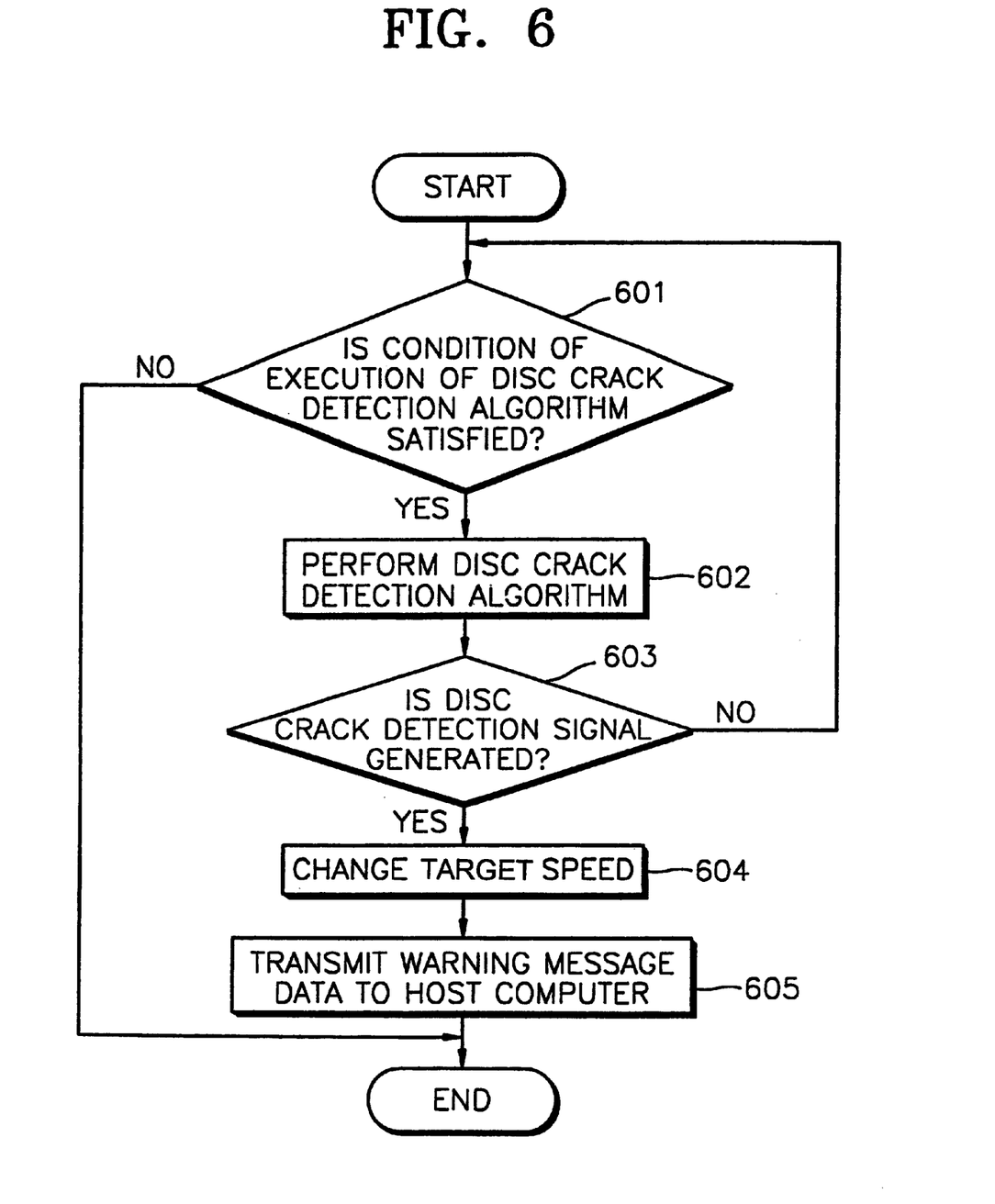
FIG. 6 is a flowchart of a method of controlling the speed of a disc drive according to yet another embodiment of the present invention.

A method of controlling the speed of a disc drive according to another embodiment of the present invention will now be described with reference to FIGS. 1 and 6. In operation 601 the system controller 109 determines whether a condition of execution of the disc crack detection algorithm is satisfied. If the condition is satisfied, in operation 602 the disc crack detection algorithm of FIG. 2 is performed. In operation 603 it is determined whether a disc crack detection signal is generated as the result of the disc crack detection algorithm. If the disc crack detection signal is not generated, the process goes back to operation 601. If the disc crack detection signal is generated, in operation 604 a target speed is changed into a low speed. In operation 605, warning message data informing that a disc crack is detected is transmitted to the host computer 112 through the interface unit 111 so that a user can recognize that a loaded disc has a crack.

The present invention can be realized as a method, an apparatus, a system and so on. When the present invention is realized as software, the software steps of the present invention are code segments which execute necessary operations. Programs or code segments may be stored in a processor readable medium or may be transmitted by a transmission medium or by a computer data signal combined with a carrier in a communication network. The processor readable medium may be any medium, such as an electronic circuit, a semiconductor memory device, a ROM, a flash memory, an erasable ROM, a floppy disc, an optical disc, a hard disc, an optical fiber medium, or a radio frequency (RF) network, which can store or transmit information. The computer data signal may be any signal which can be transmitted through a transmission medium such as an electronic network channel, an optical fiber, air, an electromagnetic field, or a RF network.

As described above, the present invention automatically determines whether a disc loaded on a disc drive has a crack in a specific mode, and automatically changes a target speed into a low speed when it is determined that the disc has a crack, thereby exactly checking the crack state of the disc during action of the disc drive, decreasing the percentage of error occurrence, and reducing the probability of damage to the disc.

Although a few embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method of detecting a crack in a disc loaded on a disc drive, the method comprising:
    determining whether the disc drive satisfies an initially set condition for execution of a disc crack detection algorithm;
    counting a number of tracking error signals whose levels exceed a predetermined threshold voltage, at predetermined measuring time periods, in response to determining that the disc drive satisfies the initially set condition; and
    generating a disc crack detection signal when the number of counted tracking error signals exceeds a predetermined number.

2. The method of claim 1, wherein the condition for execution of the disc crack detection algorithm is set such that the disc crack detection algorithm is performed whenever a play mode is changed into a pause mode.

3. The method of claim 1, wherein the condition for execution of the disc crack detection algorithm is set such that the disc crack detection algorithm is performed at predetermined time intervals in a pause mode.

4. The method of claim 1, wherein the condition for execution of the disc crack detection algorithm is set such that the disc crack detection algorithm is performed whenever a target speed of the disc drive is changed.

5. The method of claim 4, wherein the condition for execution of the disc crack detection algorithm is set such that the disc crack detection algorithm is performed whenever the target speed increases.

6. The method of claim 1, further comprising transmitting warning message data to a host computer when the disc crack detection signal is generated.

7. A method of detecting a crack in a disc loaded on a disc drive, the method comprising:
    determining whether the disc drive satisfies an initially set condition for execution of a disc crack detection algorithm;
    counting a number of focus error signals whose levels exceed a predetermined threshold voltage, at predetermined measuring time periods, in response to determining that the disc drive satisfies the initially set condition; and
    generating a disc crack detection signal when the number of counted focus error signals exceeds a predetermined number.

8. The method of claim 7, wherein the condition for execution of the disc crack detection algorithm is set such that the disc crack detection algorithm is performed whenever a play mode is changed into a pause mode.

9. The method of claim 7, wherein the condition for execution of the disc crack detection algorithm is set such that the disc crack detection algorithm is performed at predetermined time intervals in a pause mode.

10. The method of claim 7, wherein the condition for execution of the disc crack detection algorithm is set such that the disc crack detection algorithm is performed whenever the target speed of the disc drive is changed.

11. The method of claim 7, wherein the condition of execution of the disc crack detection algorithm is set such that the disc crack detection algorithm is performed whenever the target speed of the disc drive increases.

12. The method of claim 7, further comprising transmitting warning message data to a host computer when the disc crack detection signal is generated.

13. A method of controlling the speed of a disc drive, comprising
    determining whether a command instructing changing of a speed of the disc drive to a target speed is input;
    controlling a speed of a spindle motor to be the target speed according to the command;
    counting a number of tracking error signals whose levels exceed a predetermined threshold voltage, at predetermined measuring time periods until the current speed reaches the target speed;
    generating a disc crack detection signal when the number of counted tracking error signals exceeds a predetermined number; and
    changing the target speed into a predetermined low speed when the disc crack detection signal is generated.

14. A method of controlling the speed of a disc drive, comprising the operations of:
    determining whether a command instructing changing of a speed of the disc drive to a target speed is input;
    controlling a speed of a spindle motor to be the target speed according to the command;

counting a number of focus error signals whose levels exceed a predetermined threshold voltage, at predetermined measuring time periods until the current speed reaches the target speed;

generating a disc crack detection signal when the number of counted focus error signals exceeds a predetermined number; and changing the target speed into a predetermined low speed when the disc crack detection signal is generated.

15. A method of controlling the speed of a disc drive, comprising determining whether a current play mode is changed into a pause mode;

counting a number of tracking error signals whose levels exceed a predetermined threshold voltage, at predetermined measuring time periods, in response to determining that the play mode is changed into the pause mode;

generating a disc crack detection signal when the number of counted tracking error signals exceeds a predetermined number; and changing a target speed into a predetermined low speed when the disc crack detection signal is generated.

16. A method of controlling the speed of a disc drive, comprising:

determining whether a current play mode is changed into a pause mode;

counting a number of focus error signals whose levels exceed a predetermined threshold voltage, at predetermined measuring time periods, in response to determining that the play mode is changed into the pause mode;

generating a disc crack detection signal when the number of counted focus error signals exceeds a predetermined number; and changing a target speed into a predetermined low speed when the disc crack detection signal is generated.

17. A method of controlling a disc drive in which a disc is loaded, the method comprising:

determining whether a crack exists in the disc; and lowering a target speed of the disc drive in response to determining that the crack exists in the disc.

18. The method of claim 17, wherein the determining comprises:

counting a number of tracking error signals or focusing error signals whose levels exceed respective predetermined threshold values, at predetermined time intervals; and determining that the crack exists if the counted number in one of the predetermined measuring time periods exceeds a predetermined number.

19. The method of claim 17, wherein the determining comprises determining whether the crack exists in response to a play mode changing into a pause mode.

20. The method of claim 17, wherein the determining comprises determining whether the crack exists at predetermined time intervals in a pause mode.

21. The method of claim 17, wherein the determining comprises determining whether the crack exists in response to the target speed changing.

22. A method of detecting a crack in a disc loaded on a disc drive, the method comprising:

determining levels of tracking error signals or focusing error signals for predetermined time periods; and comparing the levels of the tracking error signals or the focusing error signals to a threshold value to determine whether the crack exists.

23. The method of claim 22, wherein the comparing comprises:

counting a number of tracking error signals whose levels exceed the predetermined threshold value within the predetermined time periods; and determining that the crack exists when the number of tracking error signals within one of the predetermined time periods exceeds a predetermined number.

24. The method of claim 22, wherein the comparing comprises:

counting a number of focusing error signals whose levels exceed the predetermined threshold value within the predetermined time periods; and determining that the crack exists when the number of focusing error signals within one of the predetermined time periods exceeds a predetermined number.

25. The method of claim 17, wherein the comparing comprises comparing the levels in response to a play mode changing into a pause mode.

26. The method of claim 17, wherein the comparing comprises comparing the levels at predetermined time intervals in a pause mode.

27. The method of claim 17, wherein the comparing comprises comparing the levels in response to the target speed changing.

28. A program stored on a computer readable medium for performing a method of detecting a crack in a disc loaded on a disc drive, the method comprising:

determining levels of tracking error signals or focusing error signals for predetermined time periods; and comparing the levels of the tracking error signals or the focusing error signals to a threshold value to determine whether the crack exists.

29. A system that determines whether a crack in a disc loaded on a disc drive exists, comprising:

storing a variety of execution programs in a storage medium to drive a disc drive at different speeds;

counting the number of tracking error signals or focus level signals for predetermined time periods;

determining whether a crack exists from the number of tracking error signals or focus error signals counted; and retrieving one of said variety of execution programs to control the speed of said disc drive depending on whether a crack is determined to exist.

30. The system according to claim 29, wherein said determining comprises comparing the counted number of tracking error signals or focus error signals with a predetermined threshold value.

31. The system according to claim 30, wherein if it is determined that a crack exists, retrieving an execution program which lowers a target speed of the disc drive.

* * * * *